(12) United States Patent
Ishida et al.

(10) Patent No.: US 11,212,445 B2
(45) Date of Patent: Dec. 28, 2021

(54) CAMERA SHAKE CORRECTION DEVICE

(71) Applicant: Sony Corporation, Tokyo (JP)

(72) Inventors: Yuichi Ishida, Kanagawa (JP); Masayuki Yoshii, Tokyo (JP); Toshihiko Hirota, Tokyo (JP)

(73) Assignee: Sony Corporation, Tokyo (JP)

( * ) Notice: Subject to any disclaimer, the term of this patent is extended or adjusted under 35 U.S.C. 154(b) by 69 days.

(21) Appl. No.: 16/638,010

(22) PCT Filed: Jul. 11, 2018

(86) PCT No.: PCT/JP2018/026152
§ 371 (c)(1),
(2) Date: Feb. 10, 2020

(87) PCT Pub. No.: WO2019/031146
PCT Pub. Date: Feb. 14, 2019

(65) Prior Publication Data
US 2020/0244887 A1  Jul. 30, 2020

(30) Foreign Application Priority Data
Aug. 10, 2017 (JP) .............................. JP2017-155494

(51) Int. Cl.
*H04N 5/232* (2006.01)
*G02B 27/64* (2006.01)

(52) U.S. Cl.
CPC ....... *H04N 5/23264* (2013.01); *G02B 27/646* (2013.01)

(58) Field of Classification Search
CPC .......................... G02B 27/646; H04N 5/23264
See application file for complete search history.

(56) References Cited

U.S. PATENT DOCUMENTS

| | | | |
|---|---|---|---|
| 2006/0017815 | A1 | 1/2006 | Stavely et al. |
| 2016/0377960 | A1 | 12/2016 | Ollila |
| 2017/0155816 | A1 | 6/2017 | Eiichi |

FOREIGN PATENT DOCUMENTS

| | | |
|---|---|---|
| CN | 1189232 A | 7/1998 |
| CN | 1979257 A | 6/2007 |
| CN | 200993210 Y | 12/2007 |
| CN | 101772730 A | 7/2010 |
| CN | 101808191 A | 8/2010 |

(Continued)

OTHER PUBLICATIONS

International Search Report and Written Opinion issued in connection with PCT/JP2018/026152, dated Oct. 16, 2018. (1 page).

*Primary Examiner* — Noam Reisner
(74) *Attorney, Agent, or Firm* — K&L Gates LLP

(57) ABSTRACT

Provided is a camera shake correction device including a first yoke plate, a second yoke plate that is opposed to the first yoke plate, a slider located between the first yoke plate and the second yoke plate, and slidable while supporting an image sensor, a magnet supported by the first yoke plate and configured to form a magnet circuit between the magnet and the second yoke plate, a driving coil fixed to the slider and configured to generate a driving force that slides the slider, a non-magnetic sheet provided between the magnet and the slider, and a magnetic fluid provided between the magnet and the non-magnetic sheet.

7 Claims, 12 Drawing Sheets

(56) References Cited

FOREIGN PATENT DOCUMENTS

| | | | |
|---|---|---|---|
| CN | 101976010 A | 2/2011 | |
| CN | 102472945 A | 5/2012 | |
| CN | 203414712 U | 1/2014 | |
| CN | 103926780 A | 7/2014 | |
| CN | 104136986 A | 11/2014 | |
| CN | 105511048 A | 4/2016 | |
| CN | 105717726 A | 6/2016 | |
| CN | 205679838 U | 11/2016 | |
| CN | 206039113 U | 3/2017 | |
| CN | 106773451 A | 5/2017 | |
| EP | 2015376 A1 | 1/2009 | |
| JP | 2000321614 A | 11/2000 | |
| JP | 2003283894 A | 10/2003 | |
| JP | 2006-031026 A | 2/2006 | |
| JP | 2007121980 A | 5/2007 | |
| JP | 2007-199583 A | 8/2007 | |
| JP | 2010-193308 A | 9/2010 | |
| JP | 2015099204 A | * | 5/2015 |
| TW | 200604721 A | 2/2006 | |
| TW | 201044104 A | 12/2010 | |
| WO | WO-2010044197 A | 4/2010 | |
| WO | WO-2016137081 A | 9/2016 | |

* cited by examiner

CAMERA SHAKE CORRECTION DEVICE

TECHNICAL FIELD

The present technology relates to a camera shake correction device.

BACKGROUND ART

In recent years, digital cameras have a so-called camera shake correction function that is a mechanism for reducing disturbance of images and moving images caused by camera shake of image-capturing persons. A so-called sensor shift method, which is one of camera shake correction methods, has a mechanism for performing camera shake correction by driving a slider on which an image sensor is mounted. Furthermore, recent digital cameras have been advanced in the number of pixels, the frame rate, and the like, and the power consumption and the calorific value have increased, accordingly. A sensor shift-type camera shake correction device has a structure in which a slider with an image sensor is spatially floating, and has a problem of having a difficulty in dissipating heat from the image sensor.

To solve the problem, proposals of obtaining a large heat dissipation effect by using a liquid instead of air have been made, and a structure in which a magnetic fluid is provided in a space between a coil and a magnet in a camera shake correction device has been proposed as one of the proposals (Patent Document 1).

CITATION LIST

Patent Document

Patent Document 1: Japanese Patent Application Laid-Open No. 2007-199583

SUMMARY OF THE INVENTION

Problems to be Solved by the Invention

However, there is still room for improvement in terms of release of heat generated by the image sensor.

The present technology has been made in view of such problems, and an object of the present technology is to provide a camera shake correction device capable of releasing heat generated by an image sensor to suppress temperature rise of the image sensor.

Solutions to Problems

To solve the above-described problems, the first technology is a camera shake correction device including a first yoke plate, a second yoke plate that is opposed to the first yoke plate, a slider located between the first yoke plate and the second yoke plate, and slidable while supporting an image sensor, a magnet supported by the first yoke plate and configured to form a magnet circuit between the magnet and the second yoke plate, a driving coil fixed to the slider and configured to generate a driving force that slides the slider, a non-magnetic sheet provided between the magnet and the slider, and a magnetic fluid provided between the magnet and the non-magnetic sheet.

Furthermore, the second technology is a camera shake correction device including a first yoke plate, a second yoke plate that is opposed to the first yoke plate, a slider located between the first yoke plate and the second yoke plate, and slidable while supporting an image sensor, a magnet supported by the first yoke plate and configured to form a magnet circuit between the magnet and the second yoke plate, a driving coil fixed to the slider and configured to generate a driving force that slides the slider, a magnetic sheet provided between the magnet and the slider, and a magnetic fluid provided between the magnet and a non-magnetic sheet.

Effects of the Invention

According to the present technology, it is possible to release heat generated by an image sensor to suppress temperature rise of the image sensor. Note that effects described here are not necessarily limited, and any of effects described in the specification may be exhibited.

MODE FOR CARRYING OUT THE INVENTION

Hereinafter, embodiments of the present technology will be described with reference to the drawings. Note that the description will be given in the following order.
<1. First Embodiment>
[1-1. Configuration of Imaging Device]
[1-2. Configuration of Camera Shake Correction Device]
[1-3. Heat Dissipation Effect in Camera Shake Correction Device]

<2. Second Embodiment>
[2-1. Configuration of Camera Shake Correction Device]
[2-2. Heat Dissipation Effect in Camera Shake Correction Device]
<3. Modification>

1. First Embodiment

[1-1. Configuration of Imaging Device]

Figure 1:
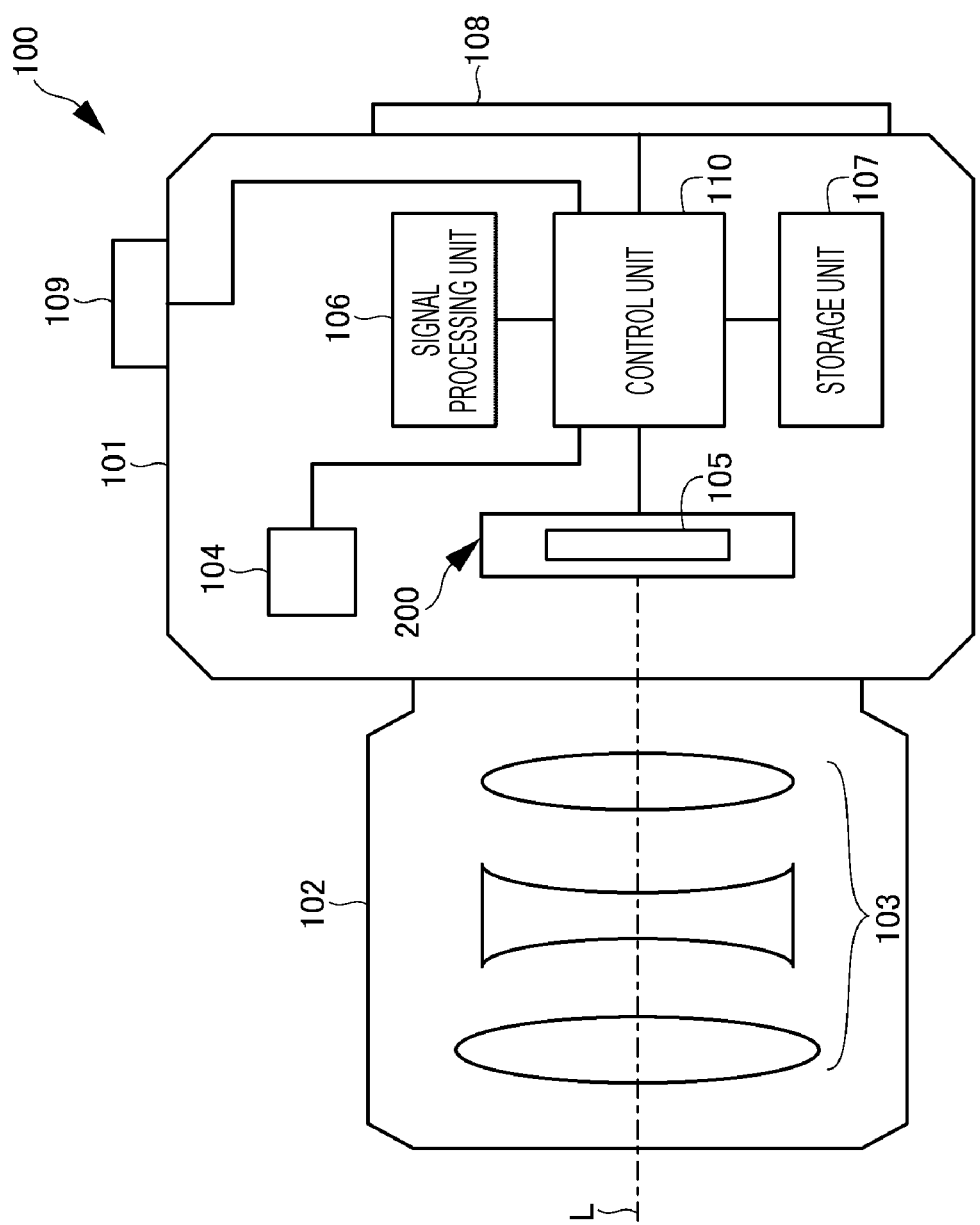
FIG. 1 is a sectional side view and block diagram illustrating a configuration of an imaging device.
Figure 2:
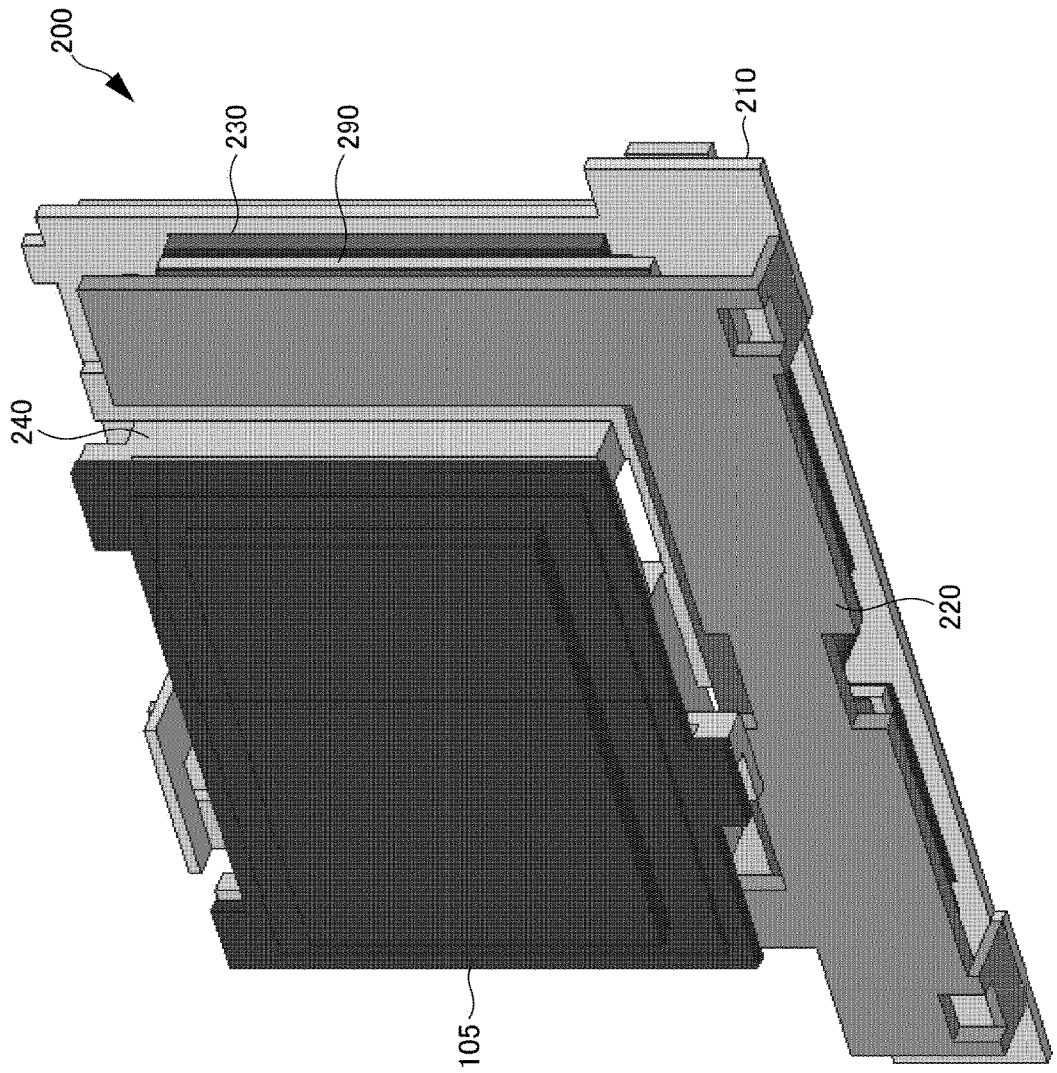
FIG. 2 is a perspective view illustrating a configuration of a camera shake correction device according to a first embodiment.
Figure 3:
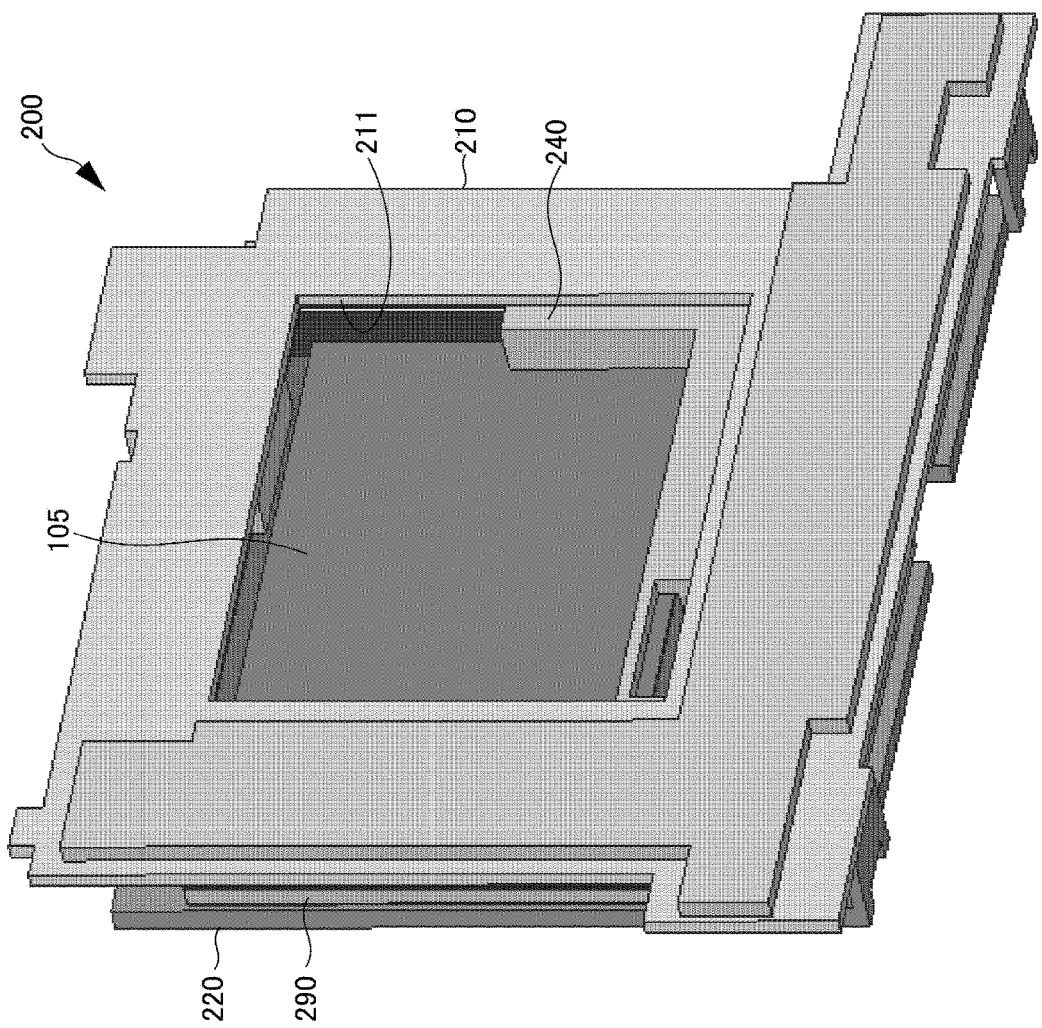
FIG. 3 is a perspective view illustrating a configuration of the camera shake correction device according to the first embodiment.

A camera shake correction device according to the present technology is used in an imaging device. FIG. 1 is a longitudinal sectional side view illustrating a configuration of an imaging device 100 incorporating a camera shake correction device 200.

The imaging device 100 includes a housing 101, a lens barrel 102, a lens group 103, a motion sensor 104, an image sensor 105, a signal processing unit 106, a storage unit 107, a display unit 108, an input unit 109, a control unit 110, and the camera shake correction device 200.

The housing 101 is a so-called camera body and incorporates each part constituting the imaging device 100. The lens barrel 102 is attached to a front side of the housing 101 and includes the lens group 103 therein. The lens barrel 102 may be configured to be attachable/detachable to/from the housing 101 or may be integrally configured with the housing 101. The lens group 103 includes, for example, a plurality of lenses such as a focus lens and a zoom lens.

The motion sensor 104 is provided in the housing 101, and is, for example, an acceleration sensor, an angular velocity sensor, a gyro sensor, or the like with respect to a biaxial or triaxial direction. The motion sensor 104 detects a motion of the imaging device 100 and outputs motion detection information to the control unit 110. Note that the motion sensor 104 may be provided in the lens barrel 102.

The camera shake correction device 200 is provided behind the lens group 103 and in the housing 101, and is configured to support the image sensor 105. The camera shake correction device 200 is arranged such that an imaging surface of the image sensor 105 becomes orthogonal to an optical axis L. The configuration of the camera shake correction device 200 will be described below.

The image sensor 105 is provided in a state of being supported by the camera shake correction device 200, and photoelectrically converts incident light from an object, converts the incident light into a charge amount, and outputs a pixel signal. Then, the image sensor 105 outputs the pixel signal to the signal processing unit 106. As the image sensor 105, a charge coupled device (CCD), a complementary metal oxide semiconductor (CMOS), or the like is used.

The signal processing unit 106 performs sampling hold for favorably holding a signal/noise (S/N) ratio by correlated double sampling (CDS) processing, auto gain control (AGC) processing, analog/digital (A/D) conversion, and the like for an imaging signal output from the image sensor 105 and generates an image signal.

Furthermore, the signal processing unit 106 may perform predetermined signal processing for the image signal, such as demosaic processing, white balance adjustment processing, color correction processing, gamma correction processing, Y/C conversion processing, auto exposure (AE) processing, and resolution conversion processing.

The storage unit 107 is, for example, a large-capacity storage medium such as a hard disk or an SD memory card. An image is stored in a compressed state on the basis of a standard such as joint photographic experts group (JPEG), for example. A moving image is stored in a format such as moving picture experts group2 (MPEG2) or MPEG4, for example.

The display unit 108 is a display device configured by, for example, a liquid crystal display (LCD), a plasma display panel (PDP), an organic electro luminescence (EL) panel, or the like. The display unit 108 displays a user interface of the imaging device 100, a menu screen, a monitoring image being captured, a captured image recorded in the storage unit 107, a captured moving image, and the like.

The input unit 109 is used for inputting a capture instruction, various settings, and the like in the imaging device 100. When an input is made by a user to the input unit 109, a control signal according to the input is generated and output to the control unit 110. Then, the control unit 110 performs arithmetic processing corresponding to the control signal and controls the imaging device 100. Examples of the input unit 109 include a release button, a capture start instruction button, a power button for power on/off switching, a hardware button such as an operator for zoom adjustment, and a touch panel integrally configured with the display unit 108.

The control unit 110 is configured by a central processing unit (CPU), a random access memory (RAM), a read only memory (ROM), and the like. The ROM stores a program that are read and operated by the CPU, and the like. The RAM is used as a work memory for the CPU. The CPU executes various types of processing according to the program stored in the ROM and issuing commands to control the entire imaging device 100.

The imaging device 100 is configured as described above.

[1-2. Configuration of Camera Shake Correction Device]

Next, a configuration of the camera shake correction device 200 will be described. The camera shake correction device 200 includes a first yoke plate 210, a second yoke plate 220, a magnet 230, a slider 240, a driving coil 250, a coil flexible printed circuit (FPC: printed circuit board) 260, an attracting yoke plate 270, a non-magnetic sheet 280, and a magnetic fluid 290, and is configured to have the slider 240 support the image sensor 105.

Figure 4:
FIG. 4 is an exploded perspective view illustrating a configuration of the camera shake correction device according to the first embodiment.

As illustrated in FIG. 4, the first yoke plate 210 and the second yoke plate 220 are arranged substantially in parallel so as to oppose each other, and are for forming a driving magnetic circuit. Both the first yoke plate 210 and the second yoke plate 220 are configured as a flat plate-like body containing a soft iron-made (metal-made member) magnetic body.

Three columnar supports 221 extending in a direction of the first yoke plate 210 are projected on a surface of the second yoke plate 220, the surface being on a side of the first yoke plate 210. An end surface of each support 221 is fixed to a surface of the first yoke plate 210 on a side opposing the second yoke plate 220. Note that the number of supports 221 is not limited to three and may be three or more.

The magnet 230 is fixed on one side of surfaces of the first yoke plate 210, the surfaces being in a direction of the second yoke plate 220. When the first yoke plate 210 and the second yoke plate 220 allow magnetic fluxes of the magnet 230 to pass, a driving magnetic circuit is formed as illustrated by the arrows M in FIG. 6. In the present embodiment, three magnets 230 are fixed on the first yoke plate 210. However, the number of magnets 230 is not limited to three, and it is better to determine the number and size according to the shape of the first yoke plate 210, the amount of the magnetic fluid 290, and the like. Note that, in the present embodiment, the magnet 230 is a magnet containing neodymium (Nd). A square-shaped opening 211 is formed in a substantially central portion of the first yoke plate 210.

The slider 240 is arranged between the first yoke plate 210 and the second yoke plate 220. The slider 240 supports the image sensor 105 to enable the image sensor 105 to be movable by a slide of the slider 240. Since the image sensor 105 is moved by the slide of the slider 240 to implement camera shake correction, the present technology is used for so-called sensor shift-type camera shake correction.

Furthermore, the driving coil 250 that generates a driving force for sliding the slider 240 is fixed to the slider 240. The driving coil 250 includes an X-direction driving coil 251 that generates a driving force for sliding the slider 240 in an X direction (horizontal direction), and a Y-direction driving coil 252 that generates a driving force for sliding the slider 240 in a Y direction (vertical direction). The X-direction driving coil 251 and the Y-direction driving coil 252 are configured such that, for example, a long coil wire is wound many times in a spiral shape.

A coil FPC 260 is provided on a surface opposite to the side of the slider 240 where the driving coil 250 is fixed, the coil FPC 260 being a flat plate and configured in a substantially L shape to correspond to the X-direction driving coil 251 and the Y-direction driving coil 252. The coil FPC 260 is connected to the X-direction driving coil 251 and the Y-direction driving coil 252, and a current from the control unit 110 is supplied to the X-direction driving coil 251 and the Y-direction driving coil 252 via the coil FPC 260.

The X-direction driving coil 251 and the Y-direction driving coil 252 generate the driving force for sliding the slider 240 by receiving the current in the magnetic field of the driving magnetic circuit formed by the first yoke plate 210, the second yoke plate 220, and the magnet 230. In the present embodiment, two X-direction driving coils 251 and one Y-direction driving coil 252 are provided, and a total of three coils are provided to correspond to the magnets 230. The X-direction driving coil 251 and the Y-direction driving coil 252 are fixed to the slider 240 by a filler 255 using an epoxy resin or the like, for example, in a state of being fitted in a driving coil installation recess formed in the slider 240. The X-direction driving coil 251 and the Y-direction driving coil 252 are in contact with the non-magnetic sheet 280 via a coating layer by the filler 255.

The slider 240 supports the image sensor 105. By supplying the current to the driving coil 250 according to the motion detection information of the imaging device 100 by the motion sensor 104 to slide the slider 240, the image sensor 105 is moved and a camera shake correction function is implemented. When the current is caused to flow from the control unit 110 to the X-direction driving coil 251 via the coil FPC 260, the driving force in the X direction is generated in the X-direction driving coil 251, as illustrated by the arrow X in FIG. 5. Furthermore, when the current is caused to flow from the control unit 110 to the Y-direction driving coil 252 via the coil FPC 260, the driving force in the Y direction is generated, as illustrated by the arrow Y in FIG. 4.

In a case where the imaging device 100 vibrates in the X direction and/or the Y direction by shake of the hand of the user who captures an image, holding the imaging device 100, the motion sensor 104 detects moving amounts (camera shake amounts) of the imaging device 100 in the X direction and the Y direction, and supplies the current to the X-direction driving coil 251 and the Y-direction driving coil 252 so as to slide the slider 240 by the same amount as the camera shake amount in an opposite direction to a moving direction of the imaging device 100. By supplying the current to the X-direction driving coil 251 and the Y-direction driving coil 252 to slide the slider 240 to move the image sensor 105, as described above, the movement of the imaging device 100 can be canceled by the movement of the image sensor 105, and the camera shake of the image sensor 105 in the X direction and the Y direction can be corrected.

The attracting yoke plate 270 is fixed to a surface of the slider 240, the surface being on a side of the second yoke plate 220. The attracting yoke plate 270 is thinner than the first yoke plate 210 and the second yoke plate 220, and is configured as a flat plate-like body containing a soft iron-made (metal-made member) magnetic body. The attracting yoke plate 270 is used for forming an attracting magnetic circuit together with the first yoke plate 210 and the magnet 230, as illustrated by the arrows N in FIG. 6.

The non-magnetic sheet 280 is configured to have a planar shape substantially equal to the shape of the magnet 230, and is provided between the slider 240 and the magnet 230. As the non-magnetic sheet 280, a non-magnetic metal sheet (copper: Cu, aluminum: Al, or the like), a graphite sheet, a resin sheet, a glass sheet, a flexible substrate, or the like can be used. Note that the heat dissipation can be improved by thinly applying the resin and glass although the resin and glass have low thermal conductivity.

By providing the non-magnetic sheet 280 on the surface of the slider 240, the surface being on the side of the magnet 230, a decrease in the magnetic field to be supplied to the X-direction driving coil 251 and the Y-direction driving coil 252 can be prevented. Thereby, the accuracy of operation control of the slider 240, that is, the accuracy of the camera shake correction, and the energy efficiency in the operation of the slider 240 can be improved. Furthermore, by providing the non-magnetic sheet 280, heat dissipation performance of the heat generated from the image sensor 105 in a direction of the magnetic fluid 290 can be improved.

The oily magnetic fluid 290 is provided such that the space between the magnet 230 and the non-magnetic sheet 280 is filled with the oily magnetic fluid 290. The magnetic fluid 290 is attracted by the magnet 230 and the non-magnetic sheet 280 by being influenced by the magnetic field of the attracting magnetic circuit, and couples the slider 240 and the magnet 230 in a relatively movable manner and keeps a gap between the magnet 230 and the non-magnetic sheet 280 constant.

By interposing the non-magnetic sheet 280 between the slider 240 and the magnet 230 and bringing the magnetic fluid 290 and the slider 240 to come in contact with each other via the non-magnetic sheet 280, irregularities in a contact surface of the magnetic fluid 290 are eliminated, and a smooth operation of the slider 240 can be realized. Furthermore, the smooth operation of the slider 240 can also be realized by the magnetic fluid 290 serving as a lubricant for the slider 240. Note that the magnetic fluid 290 can be fixed on the magnet 230 due to magnetism although the magnetic fluid 290 is a fluid.

Figure 6:
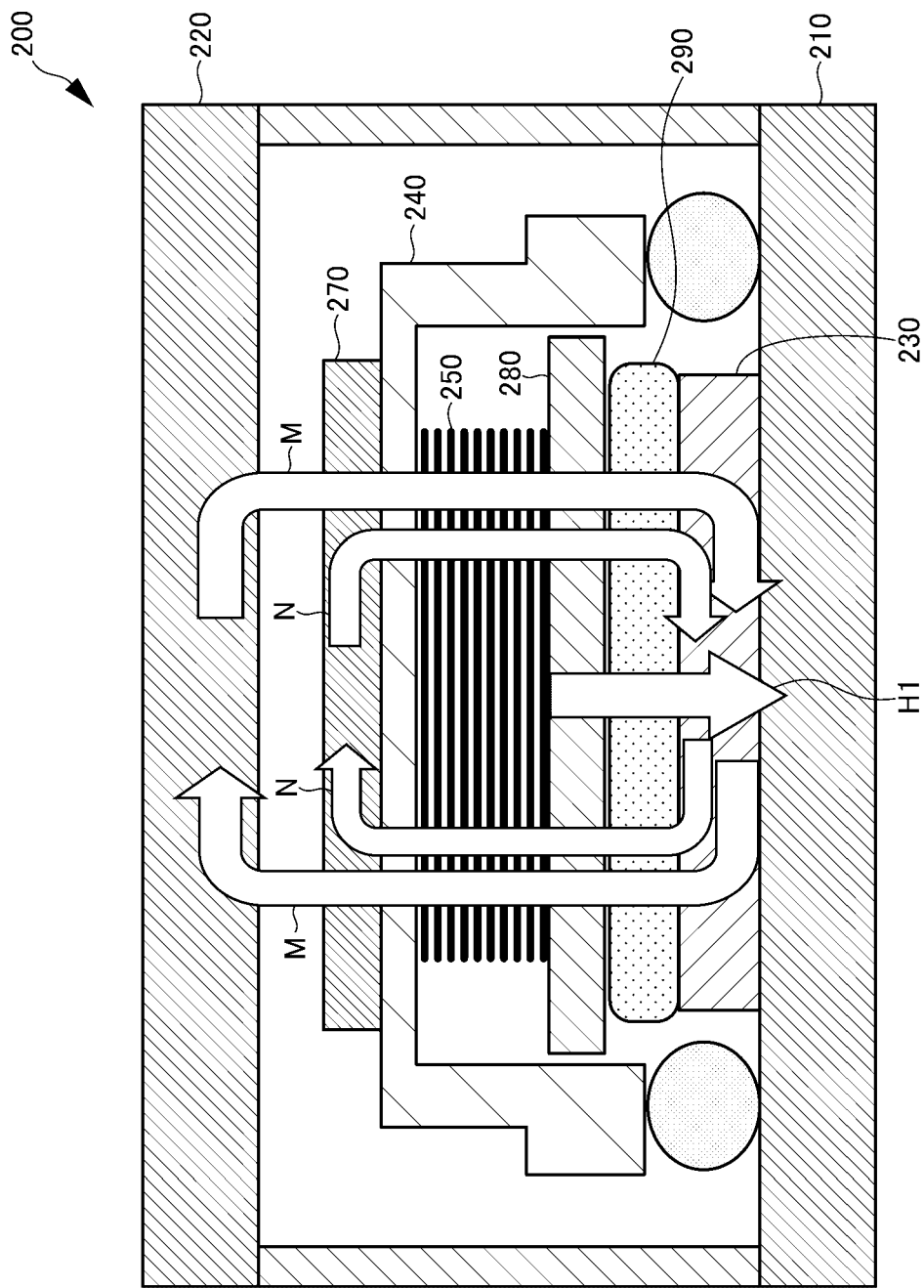
FIG. 6 is a schematic cross-sectional side view of the camera shake correction device according to the first embodiment.

Moreover, the magnetic fluid 290 also functions as a heat dissipation material that releases the heat generated from the image sensor 105 as illustrated by the arrow H1 in FIG. 6. Since the magnetic fluid 290 has higher thermal conductivity than the air, the magnetic fluid 290 can more efficiently release the heat generated from the image sensor 105 than the case where nothing is provided between the magnet 230 and the non-magnetic sheet 280 (the space therebetween is filled with the air). Details of this point will be described below. Since the magnetic fluid 290 has the function as a heat dissipation material, it is favorable to provide the magnetic fluid 290 as much as possible from the viewpoint of the heat dissipation effect and it is favorable to provide an amount that covers at least a surface of the magnet 230, the surface being in contact with the non-magnetic sheet 290. By setting the amount to the amount that covers at least a surface of the magnet 230, the surface being in contact with the non-magnetic sheet 290, the magnetic fluid 290 can be provided as much as possible within a range where the magnetic fluid 290 is not scattered by impact or the like.

The magnetic fluid 290 is a colloidal liquid having magnetic fine particles dispersed in a solvent, and has both a property of being attracted to a magnet and a property of flowing like a liquid. For example, by using magnetite (Fe3O4) having a particle size of about 10 nm as the magnetic fine particles and causing the surface of the magnetite to adsorb a dispersant (surfactant) such as an oleic acid, the magnetic fine particles can be stably dispersed without being aggregated in a base liquid such as hydrocarbon. Examples of the magnetic particles include manganese ferrite (MnFe2O4), nickel ferrite (NiFe2O4), manganese zinc ferrite (MnxZn1-xFe2O4), gamma-hematite (γ-Fe2O3), iron (Fe), and cobalt (Co), in addition to the above magnetite. Examples of the base liquid include organic substances such as kerosene, hexane, alkylnaphthalene, ester oil, hydrocarbon oil, fluorine oil, and silicone oil, and metals such as Ga and Hg, in addition to water. The dispersant (surfactant) is used for making the magnetic particles and the base liquid compatible. In the case of using magnetite, a lauric acid or an oleic acid as a water base, an oleic acid or an isostearic acid as the hydrocarbon oil, or a fluorocarbon surfactant as the fluorine oil is used.

Furthermore, a series of compounds that are a liquid at room temperature although the compounds are salts configured by only cations and anions is called an ionic liquid. Among these liquids, there is a so-called "magnetic ionic liquid" having magnetism. The magnetic ionic liquid can be said to be a kind of the magnetic fluid 290 because of having both the property of being attracted to the magnet 230 and the property of flowing like a liquid although the magnetic ionic liquid is not a colloidal liquid because of not using solid fine particles. Examples of such a "magnetic ionic liquid" include 1-butyl-3-methyl-imidazolium iron (III) chloride, 1-ethyl-3-methyl-imidazolium iron (III) chloride, and the like. In the present technology, a colloidal liquid having a magnetic fluid dispersed in a solvent is used as the magnetic fluid 290. However, a magnetic ionic liquid can also be used.

The camera shake correction device 200 is configured as described above. The camera shake correction device 200 is fixed in the housing 101 by, for example, fixing screws, bolts and nuts (not illustrated), or the like.

[1-3. Heat Dissipation Effect in Camera Shake Correction Device]

Next, the heat dissipation effect in the camera shake correction device 200 according to the first embodiment will be described. In general, the thermal conductivity of a liquid is higher than the thermal conductivity of the air. Therefore, in the present embodiment, by providing the magnetic fluid 290, the heat generated from the image sensor 105 can be more efficiently released than a case where nothing is provided between the second yoke plate 220 and the driving coil 250 (the space therebetween is filled with the air).

Figure 5:
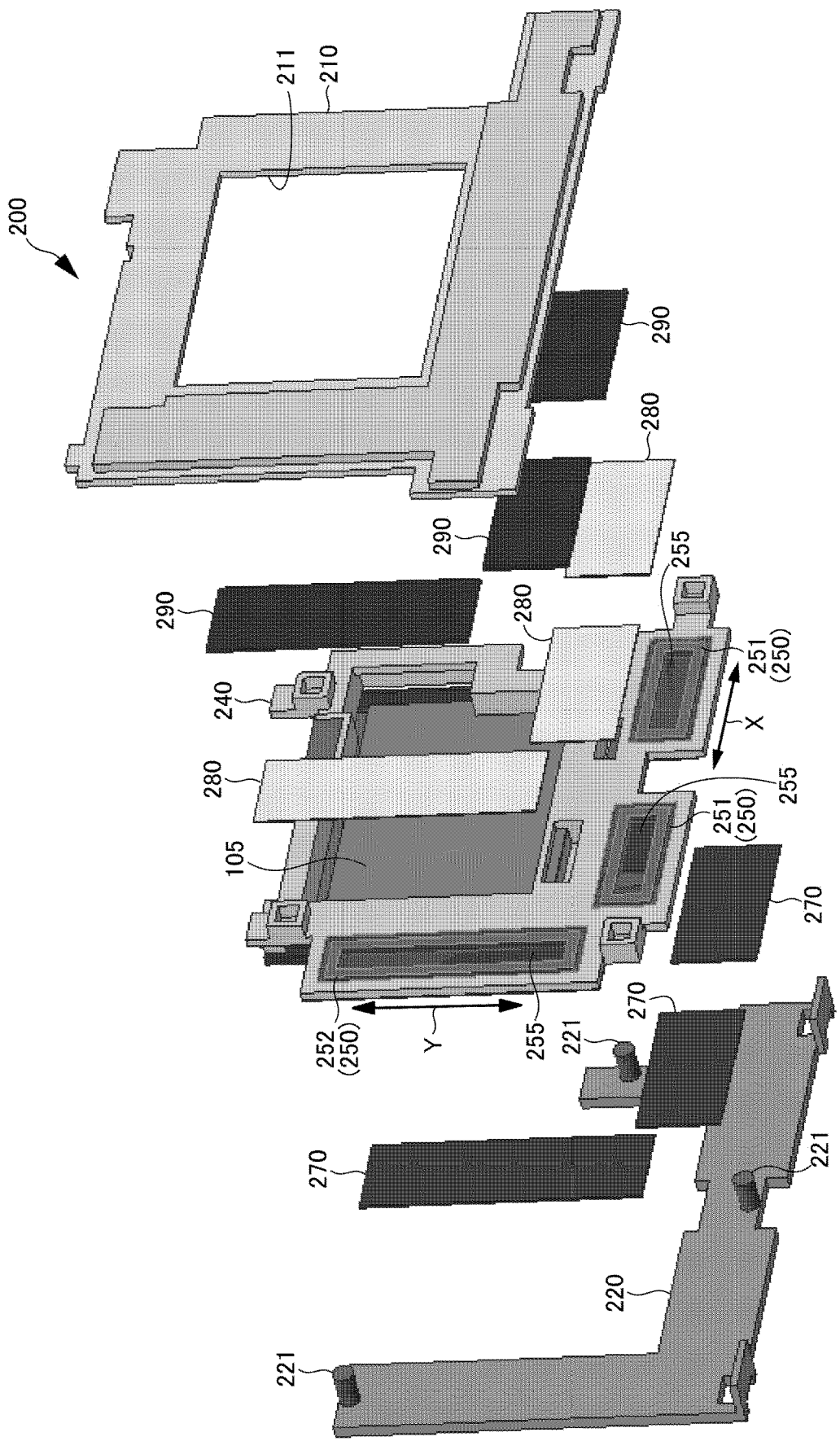
FIG. 5 is an exploded perspective view illustrating a configuration of the camera shake correction device according to the first embodiment.
Figure 7:
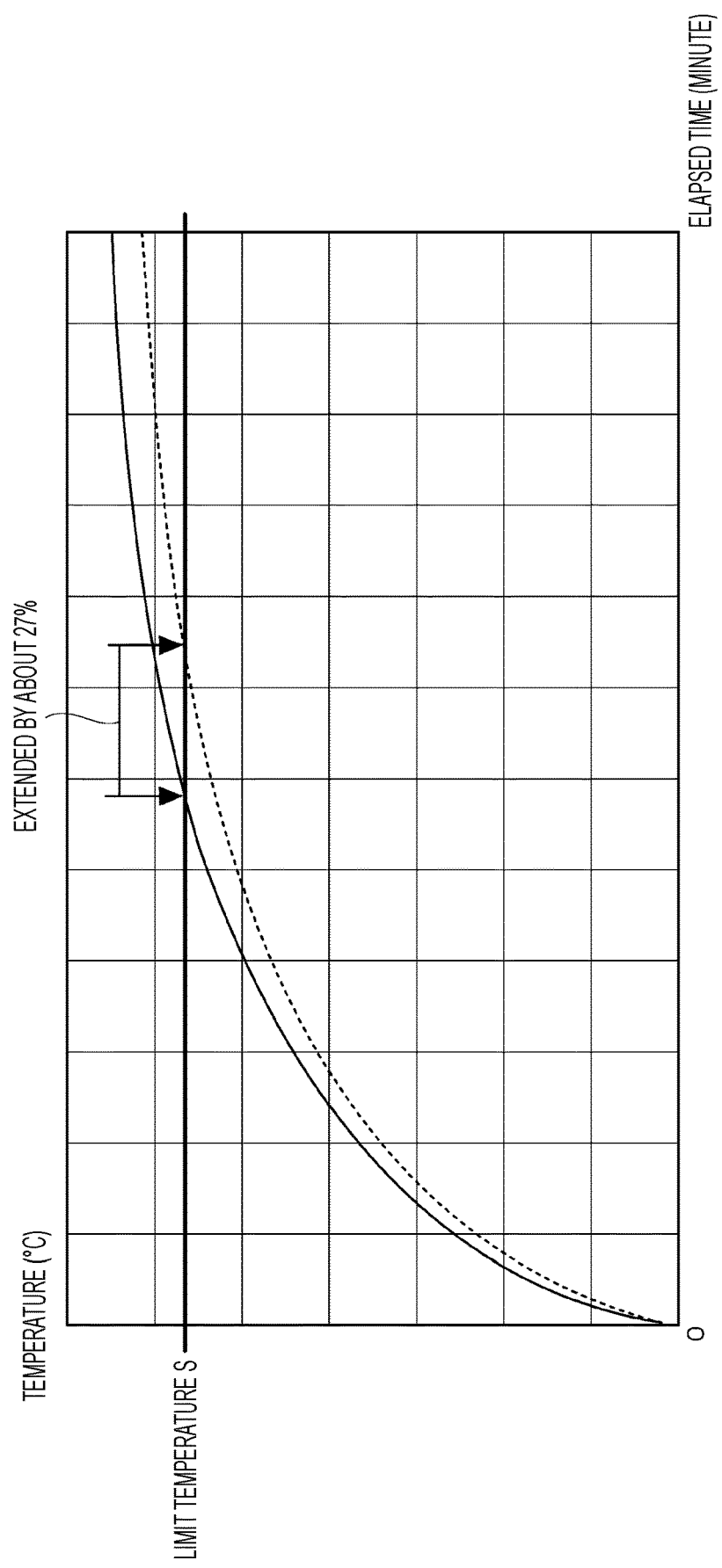
FIG. 7 is a graph illustrating temperature change of an image sensor.

FIG. 7 is a graph illustrating a result of temperature change simulation of the image sensor 105 in a case where an ambient temperature is 40° C., and the magnetic fluids 290 are provided at three places between the second yoke plate 220 and the driving coil 250, as illustrated in FIGS. 4 to 6. The solid line in the graph in FIG. 7 illustrates temperature change in a case where the magnetic fluid 290 is not provided, and the broken line illustrates temperature change in a case where the magnetic fluids 290 are provided at three places. Note that a limit temperature S in the graph in FIG. 7 is a limit temperature at which the image sensor 105 becomes inoperable.

In the case of using the magnetic fluid 290 illustrated by the broken line, temperature rise of the image sensor 105 is suppressed by the heat dissipation effect of the magnetic fluid 290, and the time to reach the limit temperature S at which the image sensor 105 becomes inoperable can be extended, as compared with the case of using no magnetic fluid 290 illustrated by the solid line. In the result illustrated in FIG. 7, the time until the temperature of the image sensor 105 reaches the limit temperature S is extended by about 27% by providing the magnetic fluid 290. By extending the time to reach the limit temperature S, an operable time of the image sensor 105, that is, a capturable time of the image sensor 105 can be extended.

Figure 8:
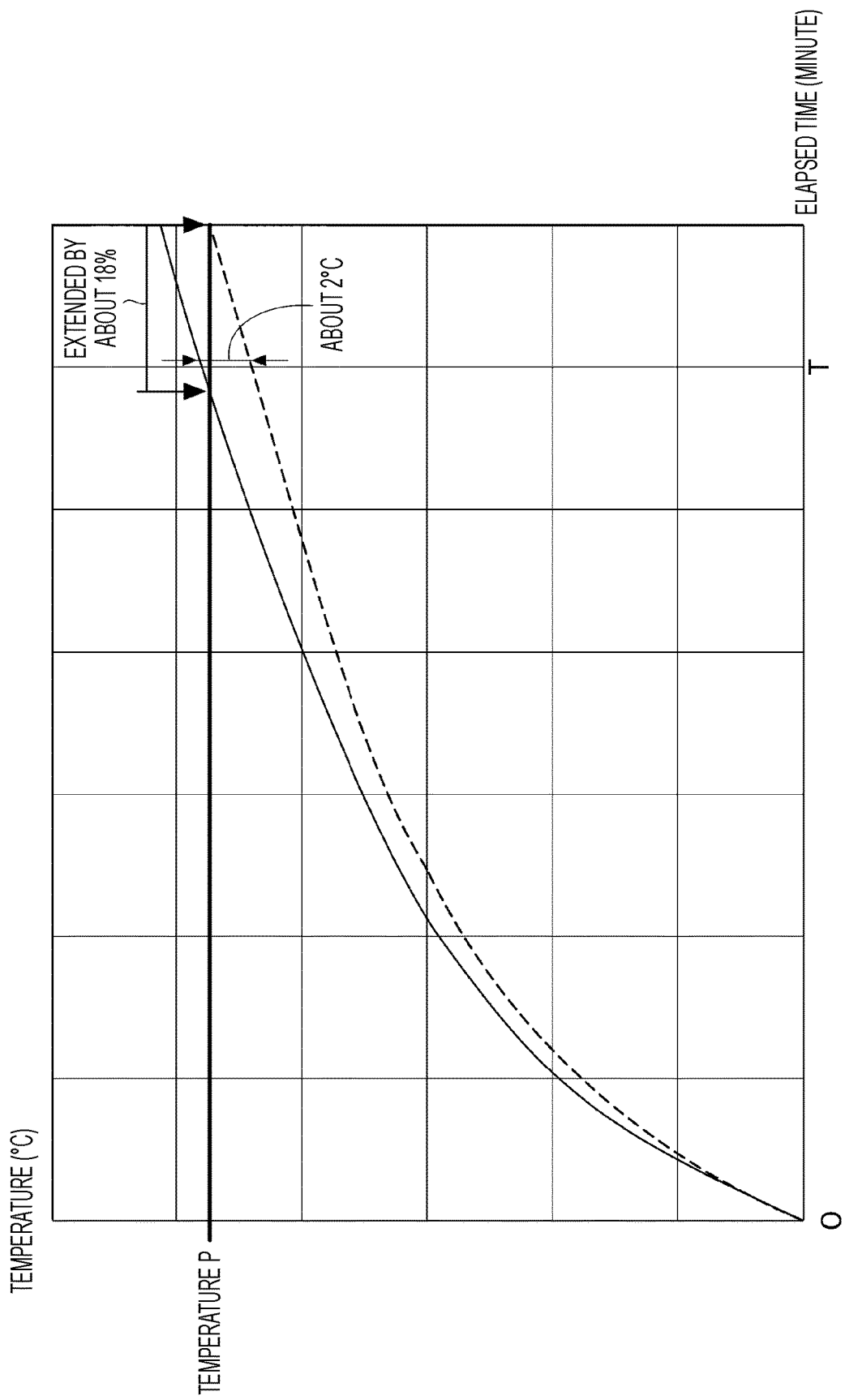
FIG. 8 is a graph illustrating temperature change of the image sensor.

Furthermore, FIG. 8 is a graph illustrating a result of temperature change simulation of the image sensor 105 in a case where an ambient temperature is 25° C., and the magnetic fluids 290 are provided at three places, as illustrated in FIGS. 4 to 6. The solid line in the graph in FIG. 8 illustrates temperature change in a case where the magnetic fluid 290 is not provided, and the broken line illustrates temperature change in a case where the magnetic fluids 290 are provided at three places.

At time T after a predetermined time has elapsed since the start of the temperature rise of the image sensor 105, the temperature of the image sensor 105 is lowered by about 2 degrees in the case where the magnetic fluid 290 is provided, as compared with the case where the magnetic fluid is not provided, in the case where the magnetic fluid 290 is provided. Furthermore, in the case where the magnetic fluid 290 is provided, the time to reach a temperature P is extended by about 18%, as compared with the case where the magnetic fluid is not provided. As described above, it has been confirmed that the temperature rise of the image sensor 105 can be suppressed even under different environmental temperatures, and the operable time of the image sensor 105, that is, the capturable time of the image sensor 105 can be extended. Note that, by suppressing the temperature rise of the image sensor 105, noise in images and moving images acquired by capture can also be reduced.

As described above, the heat dissipation effect in the camera shake correction device 200 according to the first embodiment has been confirmed. Note that the heat dissipation effect increases as the amount of the magnetic fluid 290 increases. For the purpose, it is necessary to increase the size of the magnet 230 for retaining the magnetic fluid 290 and the size of the camera shake correction device 200 itself. Therefore, it is better to determine the amount of the magnetic fluid 290 from the viewpoint of the heat dissipation effect and whether or not the camera shake correction device 200 having an increased size can be accommodated in the housing 101.

2. Second Embodiment

[2-1. Configuration of Camera Shake Correction Device]

Figure 9:
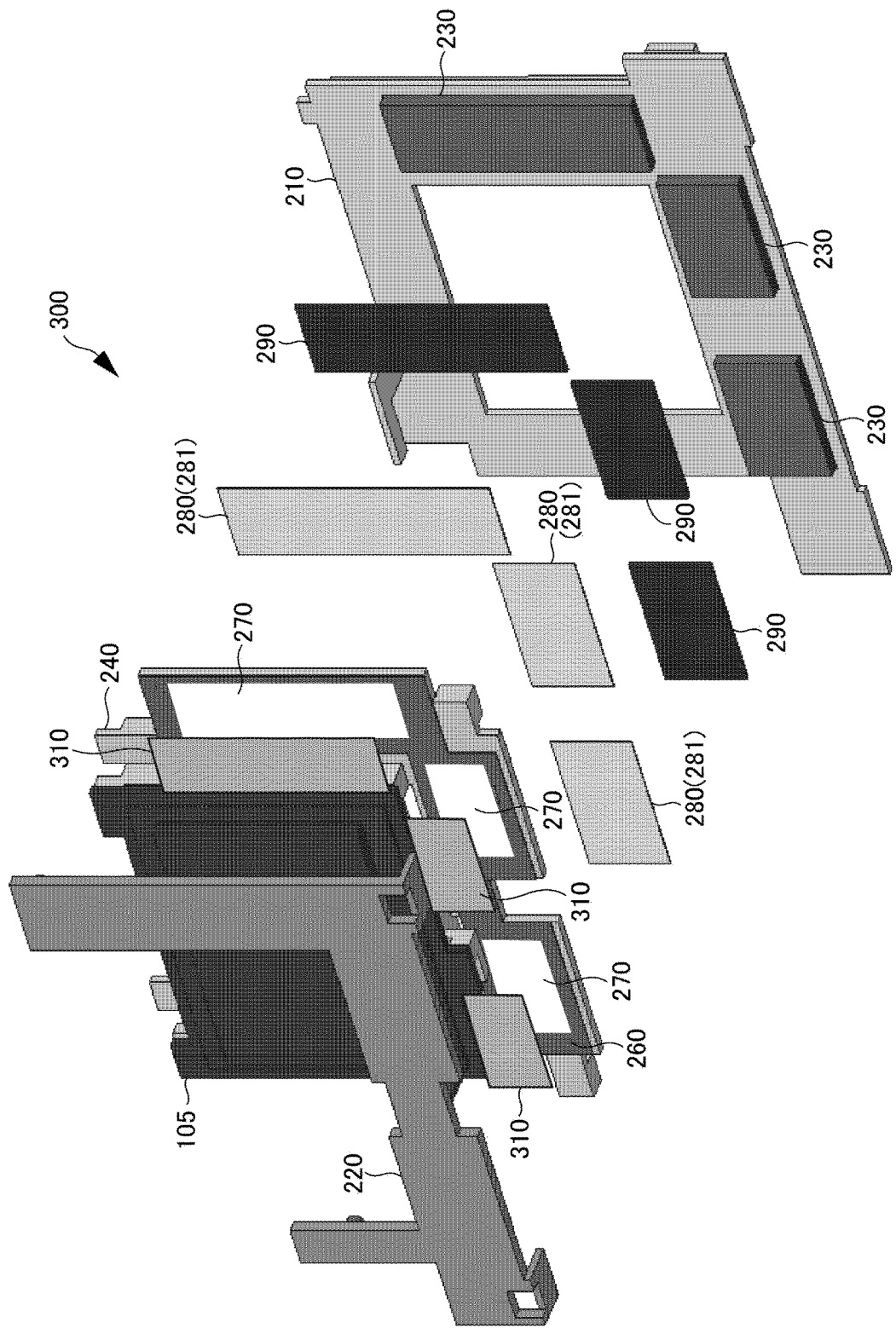
FIG. 9 is an exploded perspective view illustrating a configuration of a camera shake correction device according to a second embodiment.
Figure 10:
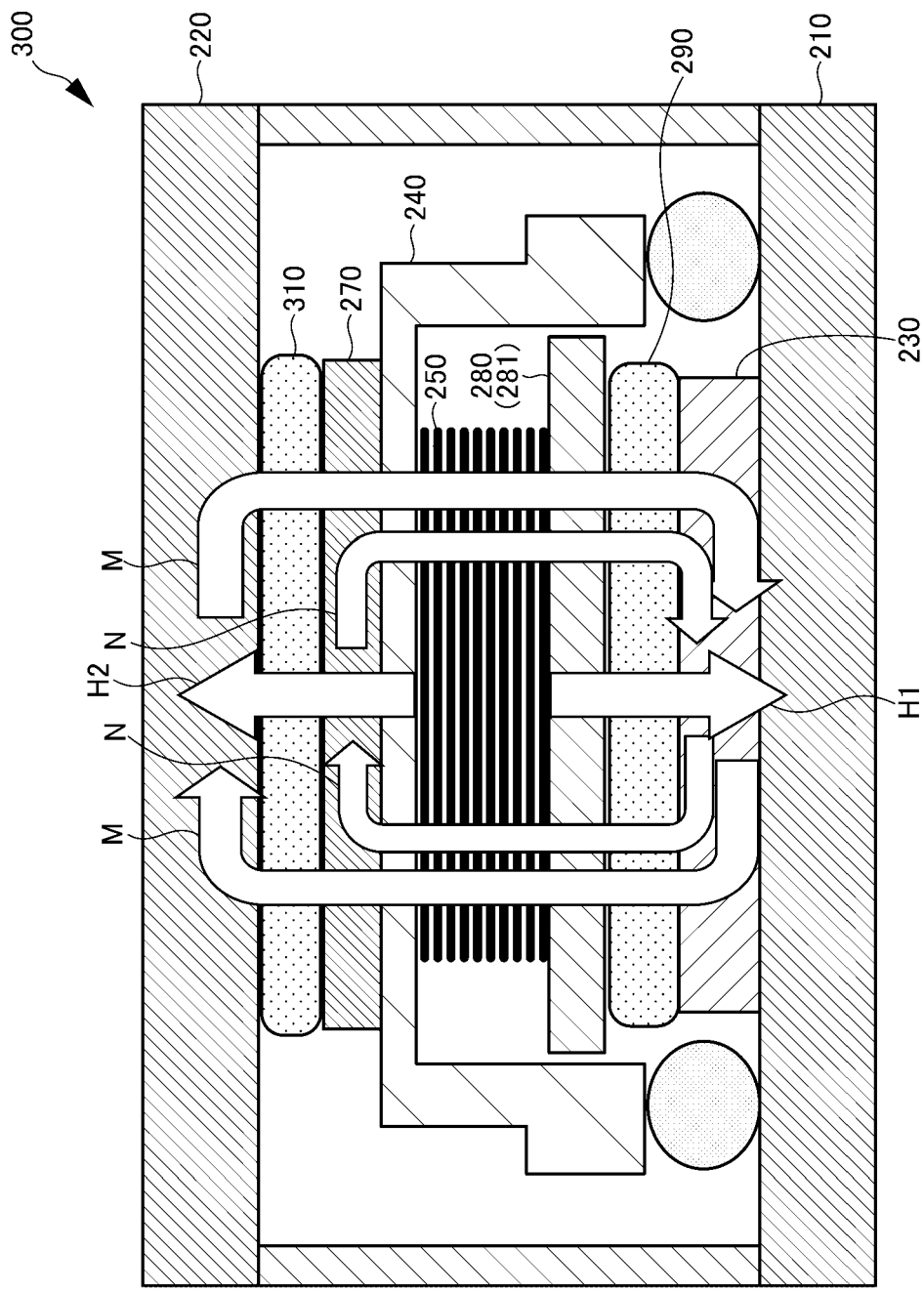
FIG. 10 is a schematic cross-sectional side view of the camera shake correction device according to the second embodiment.

Next, a second embodiment of the present technology will be described. Since the configuration of an imaging device 100 is similar to the configuration of the first embodiment, description is omitted. As illustrated in FIGS. 9 and 10, in a camera shake correction device 300 according to the second embodiment, a magnetic fluid 310 is provided such that the space between a second yoke plate 220 and an attracting yoke plate 270 is filled with the magnetic fluid 310, in addition to a magnetic fluid 290 provided between the second yoke plate 220 and a non-magnetic sheet 280.

The magnetic fluid 310 is similar to the magnetic fluid 290 provided between the magnet 230 and the non-magnetic sheet 280 in the first embodiment. A magnetic field of a magnet 230 reaches the second yoke plate 220 and the attracting yoke plate 270, and forms a magnetic circuit as indicated by the arrows N in FIG. 10. The magnetic fluid 310 is attracted to the second yoke plate 220 and the attracting yoke plate 270 by being influenced by the magnetic field of the magnetic circuit, and movably couples the slider 240 to the second yoke plate 220.

Note that, in the second embodiment, a magnetic sheet 281 may be used instead of the non-magnetic sheet 280. As the magnetic sheet, iron (Fe) or an alloy of iron (Fe) can be used. Note that use of the non-magnetic sheet rather than the magnetic sheet is desirable from the viewpoint of the heat dissipation effect and the energy efficiency of an operation of the slider 240 by current supply to a driving coil 250. In the second embodiment, configurations other than the above are similar to the configurations in the first embodiment, and thus detailed description thereof is omitted.

By providing the magnetic fluid 310 between the second yoke plate 220 and the attracting yoke plate 270, three magnetic fluids 290 are provided between a first yoke plate 210 and the driving coil 250 and three magnetic fluids 310 are provided between the attracting yoke plate 270 and the second yoke plate 220, as illustrated in FIG. 9, and a total of six magnetic fluids are provided. With the configuration, as illustrated by the arrow H2 in FIG. 10, heat generated from an image sensor 105 can also be released in a direction of the first yoke plate 210 (arrow H2 direction), in addition to a direction of the second yoke plate 220 (arrow H1 direction). Thereby, the heat dissipation effect in the camera shake correction device 300 can be further enhanced.

[2-2. Heat Dissipation Effect in Camera Shake Correction Device]

Next, the heat dissipation effect in the camera shake correction device 300 according to the second embodiment will be described. In general, the thermal conductivity of a liquid is higher than the thermal conductivity of the air. Therefore, in the second embodiment, by providing the magnetic fluid 310 between the attracting yoke plate 270 and the first yoke plate 210, the heat generated from the image sensor 105 can be more efficiently released than in a case where no magnetic fluid is provided (the space therebetween is filled with the air).

Figure 11:
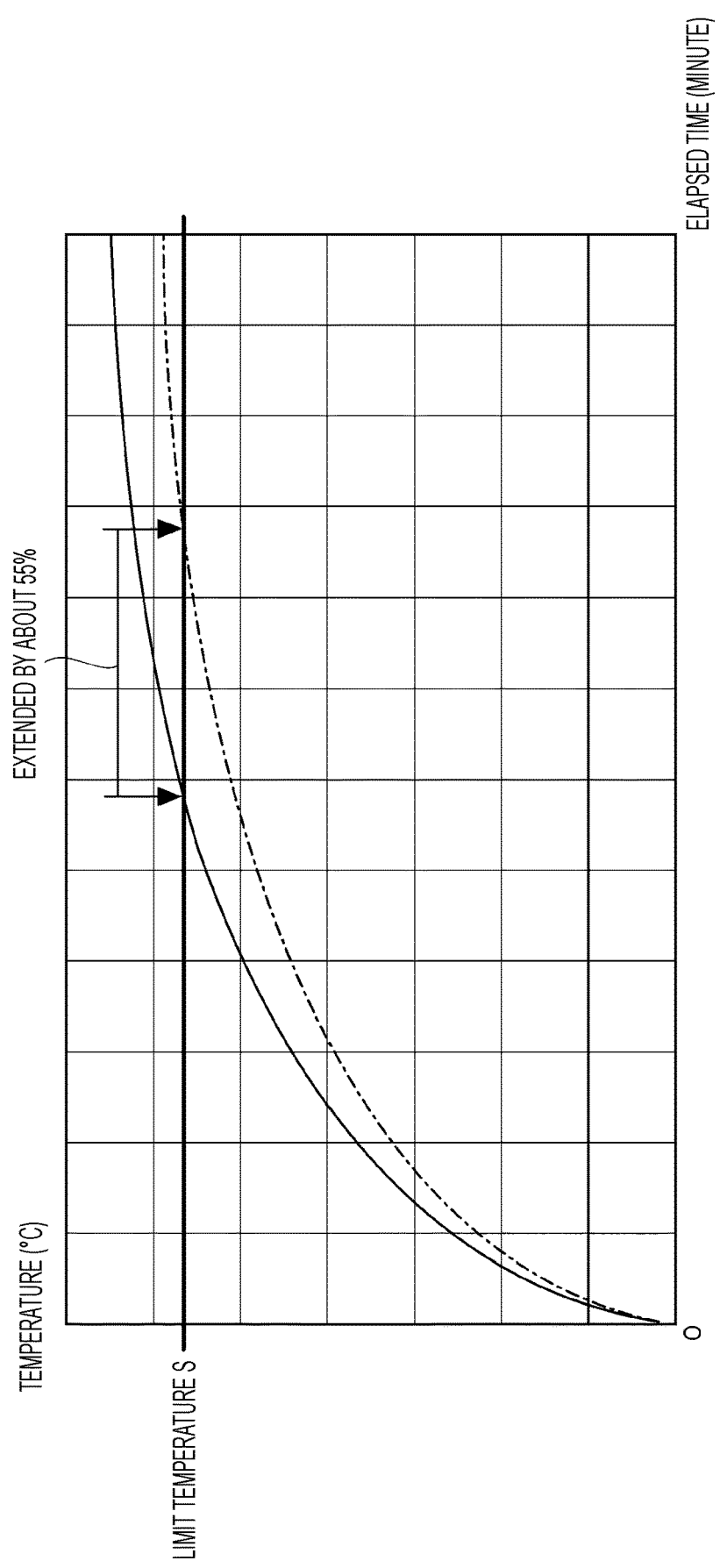
FIG. 11 is a graph illustrating temperature change of an image sensor.

FIG. 11 is a graph illustrating a result of temperature change simulation of the image sensor 105 in a case where an ambient temperature is 40° C., and the magnetic fluids 290 are provided at three places between the second yoke plate 220 and the driving coil 250 and the magnetic fluids 310 are provided at three places between the attracting yoke plate 270 and the first yoke plate 210, that is, the magnetic fluids are provided at a total of six places. The solid line in the graph in FIG. 11 illustrates temperature change in a case where the magnetic fluid is not provided, and the one-dot chain line illustrates temperature change in a case where the magnetic fluids 290 and the magnetic fluids 310 are provided at a total of six places. Note that a limit temperature S in the graph in FIG. 11 is a limit temperature at which the image sensor 105 becomes inoperable.

As can be seen from a comparison of the case of using the magnetic fluid 290 and magnetic fluid 310 illustrated by the one-dot chain line with the case of using no magnetic fluid illustrated by the solid line, temperature rise of the image sensor 105 is suppressed by the heat dissipation effect of the magnetic fluids, and the time to reach the limit temperature S at which the image sensor 105 becomes inoperable can be extended. In the result illustrated in FIG. 11, the time until the temperature of the image sensor 105 reaches the limit temperature S is extended by about 55% by providing the magnetic fluid 290 and the magnetic fluid 310. By extending the time to reach the limit temperature S, an operable time of the image sensor 105, that is, a capturable time of the image sensor 105 can be extended.

As described above, the heat dissipation effect in the camera shake correction device 300 according to the second embodiment has been confirmed. Note that it is better to determine the amounts of the magnetic fluid 290 and the magnetic fluid 310 from the viewpoint of the heat dissipation effect and whether or not the camera shake correction device 300 having an increased size can be accommodated in the housing 101, similarly to the first embodiment.

3. Modification

The embodiments of the present technology have been specifically described. However, the present technology is not limited to the above-described embodiments, and various modifications based on the technical idea of the present technology can be made.

Figure 12:
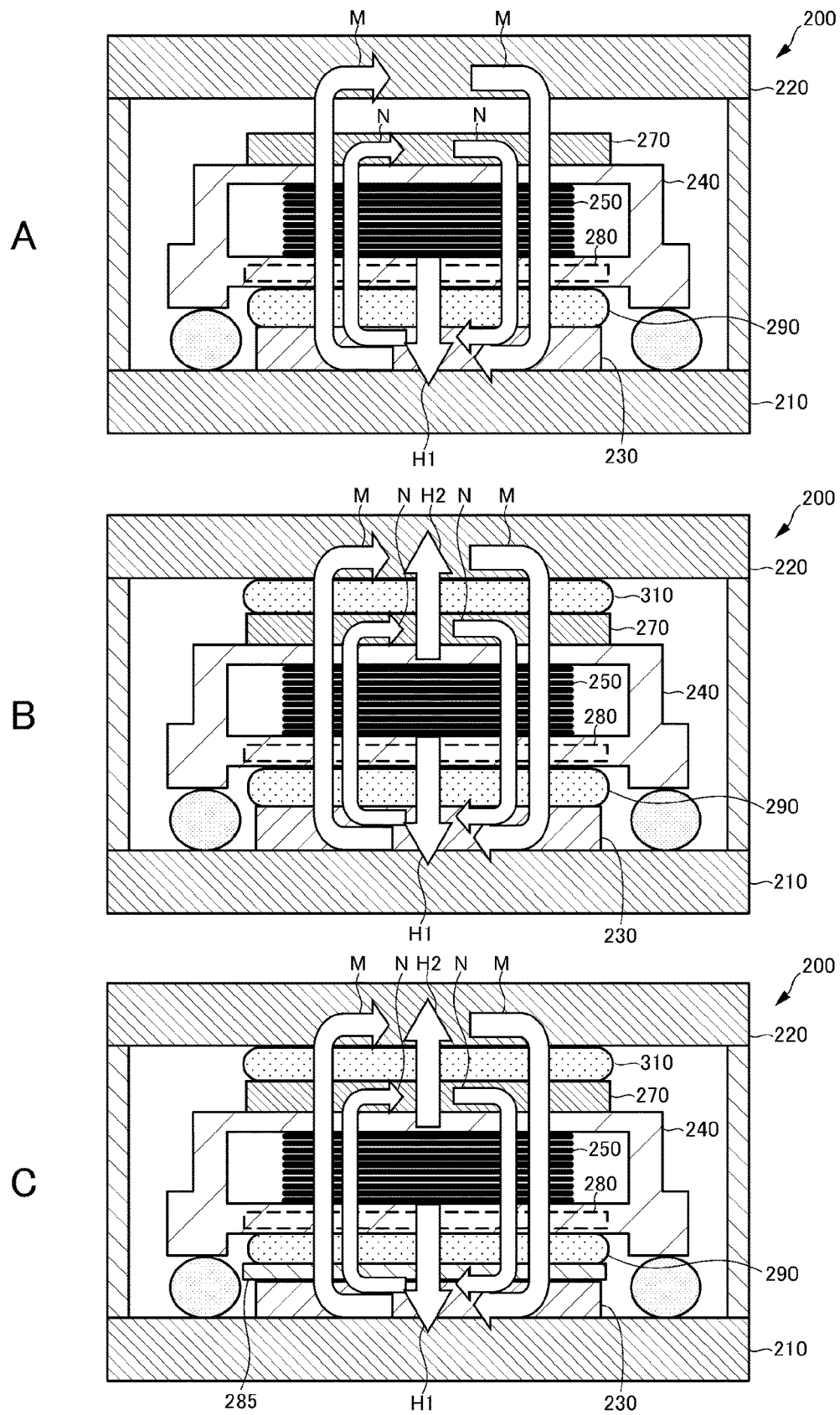
FIG. 12A is a schematic cross-sectional side view illustrating a first modification.
FIG. 12B is a schematic cross-sectional side view illustrating a second modification.
FIG. 12C is a schematic cross-sectional side view illustrating a third modification.

FIG. 12A is a diagram illustrating a first modification. In the first modification, the non-magnetic sheet 280 is embedded in the slider 240 to integrally form the slider 240 and the non-magnetic sheet 280, and a portion directly under the coil of the slider 240 is integrally molded with the slider 240. With this configuration, since work to attach the non-magnetic sheet 280 to the slider 240 is not necessary, there is no problem of uneven attachment in an attaching process. Furthermore, since the process of attaching the non-magnetic sheet 280 to the slider 240 is not necessary, the manufacturing process of the camera shake correction device 200 can be simplified and the manufacturing cost can be reduced.

Furthermore, with this configuration, a decrease in magnetic force to be supplied to the driving coil 250 can be prevented. For example, in a case where a magnesium alloy is used for the slider 240, the portion directly under the coil can be integrally molded by a casting method. The magnesium alloy has higher thermal conductivity (150 W/mK) than the thermal conductivity (85 W/mK) of an iron yoke plate, and in the case of integral molding, a contact heat resistance generated in the case of attaching the non-magnetic sheet 280 to the slider 240 is eliminated, which is advantageous for the heat dissipation.

Furthermore, as in a second modification illustrated in FIG. 12B, the magnetic fluid 310 may be provided between the attracting yoke plate 270 and the second yoke plate 220 by applying the second embodiment to the first modification. Thereby, heat of the image sensor 105 can also be released in the direction of the second yoke plate 220 (arrow H2 direction) in addition to heat dissipation in the direction of the first yoke plate 210 (arrow H1 direction), and the heat dissipation effect can be further enhanced.

Moreover, as in a third modification illustrated in FIG. 12C, a non-magnetic sheet 285 may be further provided between the magnet 230 and the magnetic fluid 290 with respect to the configuration of the second modification. In the third modification, the non-magnetic sheet 280 is provided between the driving coil 250 and the magnetic fluid 290, and moreover, the non-magnetic sheet 285 is provided between the magnet 230 and the magnetic fluid 290. In the third modification, the heat dissipation effect can be further enhanced due to the increase in the number of non-magnetic sheets to two layers. The non-magnetic sheet 285 corresponds to a second non-magnetic sheet in the claims.

In the third modification, the non-magnetic sheet 285 is provided between the driving coil 250 and the magnetic fluid 290 and between the magnet 230 and the magnetic fluid 290. However, a configuration in which a non-magnetic sheet is provided only in the magnet 230 and the magnetic fluid 290 is also possible.

The present technology can be applied to any camera as long as the camera has a camera shake correction function, such as a single-lens reflex digital camera, a compact digital camera, or a mirrorless camera without a mirror mechanism.

Furthermore, the present technology can be applied to any device as long as the device has an imaging function and a camera shake correction function, such as a smartphone, a tablet terminal, a personal computer, a portable game machine, or a wearable terminal, in addition to a digital camera.

Furthermore, the magnetic fluid is not limited to an oily magnetic fluid, and an aqueous magnetic fluid may be used.

The present technology can also have the following configurations.

(1)

A camera shake correction device including:

a first yoke plate;

a second yoke plate that is opposed to the first yoke plate;

a slider located between the first yoke plate and the second yoke plate, and slidable while supporting an image sensor;

a magnet supported by the first yoke plate and configured to form a magnet circuit between the magnet and the second yoke plate;

a driving coil fixed to the slider and configured to generate a driving force that slides the slider;

a non-magnetic sheet provided between the magnet and the slider; and a magnetic fluid provided between the magnet and the non-magnetic sheet.

(2)

The camera shake correction device according to (1), in which an attracting yoke plate is provided between the second yoke plate and the slider, and a magnetic fluid is provided between the attracting yoke plate and the second yoke plate.

(3)

The camera shake correction device according to (1) or (2), in which the non-magnetic sheet and the slider are configured by integral molding.

(4)

The camera shake correction device according to any one of (1) to (3), in which a second non-magnetic sheet is provided between the magnet and the magnetic fluid.

(5)

The camera shake correction device according to any one of (1) to (4), in which the magnetic fluid is provided to cover at least a surface of the magnet on a side of the non-magnetic sheet.

(6)

The camera shake correction device according to any one of (1) to (5), in which the driving coil is fixed to the slider by an epoxy resin, and the magnetic fluid is in contact with the driving coil via the epoxy resin.

(7)

A camera shake correction device including:

a first yoke plate;

a second yoke plate that is opposed to the first yoke plate;

a slider located between the first yoke plate and the second yoke plate, and slidable while supporting an image sensor;

a magnet supported by the first yoke plate and configured to form a magnet circuit between the magnet and the second yoke plate;

a driving coil fixed to the slider and configured to generate a driving force that slides the slider;

a magnetic sheet provided between the magnet and the slider; and a magnetic fluid provided between the magnet and the non-magnetic sheet.

REFERENCE SIGNS LIST

105 Image sensor
200, 300 Camera shake correction device
210 First yoke plate
220 Second yoke plate
230 Magnet
240 Slider
250 Driving coil
270 Attracting yoke plate
280 Non-magnetic sheet
290, 310 Magnetic fluid

The invention claimed is:

1. A camera shake correction device comprising:
a first yoke plate;
a second yoke plate that is opposed to the first yoke plate;
a slider located between the first yoke plate and the second yoke plate, and slidable while supporting an image sensor;
a magnet supported by the first yoke plate and configured to form a magnet circuit between the magnet and the second yoke plate;
a driving coil fixed to the slider and configured to generate a driving force that slides the slider;
a non-magnetic sheet provided between the magnet and the slider; and
a magnetic fluid provided between the magnet and the non-magnetic sheet,
wherein an attracting yoke plate is provided between the second yoke plate and the slider, and a magnetic fluid is provided between the attracting yoke plate and the second yoke plate.

2. The camera shake correction device according to claim 1, wherein
the non-magnetic sheet and the slider are configured by integral molding.

3. The camera shake correction device according to claim 1, wherein
the magnetic fluid is provided to cover at least a surface of the magnet on a side of the non-magnetic sheet.

4. A camera shake correction device comprising:
a first yoke plate;
a second yoke plate that is opposed to the first yoke plate;
a slider located between the first yoke plate and the second yoke plate, and slidable while supporting an image sensor;
a magnet supported by the first yoke plate and configured to form a magnet circuit between the magnet and the second yoke plate;
a driving coil fixed to the slider and configured to generate a driving force that slides the slider;

a non-magnetic sheet provided between the magnet and the slider; and a magnetic fluid provided between the magnet and the non-magnetic sheet, wherein a second non-magnetic sheet is provided between the magnet and the magnetic fluid.

5. A camera shake correction device comprising:

a first yoke plate;

a second yoke plate that is opposed to the first yoke plate;

a slider located between the first yoke plate and the second yoke plate, and slidable while supporting an image sensor;

a magnet supported by the first yoke plate and configured to form a magnet circuit between the magnet and the second yoke plate;

a driving coil fixed to the slider and configured to generate a driving force that slides the slider;

a non-magnetic sheet provided between the magnet and the slider; and a magnetic fluid provided between the magnet and the non-magnetic sheet, wherein the driving coil is fixed to the slider by an epoxy resin, and the magnetic fluid is in contact with the driving coil via the epoxy resin.

6. A camera shake correction device comprising:

a first yoke plate;

a second yoke plate that is opposed to the first yoke plate;

a slider located between the first yoke plate and the second yoke plate, and slidable while supporting an image sensor;

a magnet supported by the first yoke plate and configured to form a magnet circuit between the magnet and the second yoke plate;

a driving coil fixed to the slider and configured to generate a driving force that slides the slider;

a magnetic sheet provided between the magnet and the slider; and a magnetic fluid provided between the magnet and the magnetic sheet, wherein an attracting yoke plate is provided between the second yoke plate and the slider, and a magnetic fluid is provided between the attracting yoke plate and the second yoke plate.

7. A camera shake correction device comprising:

a first yoke plate;

a second yoke plate that is opposed to the first yoke plate;

a slider located between the first yoke plate and the second yoke plate, and slidable while supporting an image sensor;

a magnet supported by the first yoke plate and configured to form a magnet circuit between the magnet and the second yoke plate;

a driving coil fixed to the slider and configured to generate a driving force that slides the slider;

a magnetic sheet provided between the magnet and the slider; and a magnetic fluid provided between the magnet and the magnetic sheet, wherein the driving coil is fixed to the slider by an epoxy resin, and the magnetic fluid is in contact with the driving coil via the epoxy resin.

\* \* \* \* \*